United States Patent [19]

Fally

[11] 4,242,307
[45] Dec. 30, 1980

[54] DEVICE FOR PRODUCING POLYCRYSTALLINE SILICON

[75] Inventor: Jacques Fally, Orsay, France

[73] Assignee: Societe Anonyme Dite: Compagnie Generale d'Electricite, Paris, France

[21] Appl. No.: 48,116

[22] Filed: Jun. 13, 1979

[30] Foreign Application Priority Data

Jul. 11, 1978 [FR] France .............. 78 20660

[51] Int. Cl.³ .................. B01J 8/04; B01D 9/00; C01B 33/02; C30B 11/02
[52] U.S. Cl. ..................... 422/194; 156/605; 156/624; 156/DIG. 64; 422/248; 423/350
[58] Field of Search ............ 422/129, 187, 188, 189, 422/193, 194, 248, 245 (U.S. only); 156/605, 616 R, 616 A, 617 M, 617 V, 619, 621, 622, 624, DIG. 64, DIG. 73; 423/350; 23/295 R

[56] References Cited

U.S. PATENT DOCUMENTS

| | | | |
|---|---|---|---|
| 2,901,325 | 8/1959 | Theuerer | 422/248 X |
| 3,022,144 | 2/1962 | Addamiano | 156/605 X |
| 3,119,778 | 1/1964 | Hamilton | 156/605 X |
| 3,370,927 | 2/1968 | Faust, Jr. | 156/619 |
| 3,960,501 | 6/1976 | Butuzov et al. | 422/248 X |
| 3,998,686 | 12/1976 | Meiling et al. | 422/248 X |
| 4,040,894 | 8/1977 | Rodot et al. | 156/621 X |
| 4,054,641 | 10/1977 | Carman | 422/188 X |

FOREIGN PATENT DOCUMENTS

1173690 12/1969 United Kingdom .......... 156/617 V

*Primary Examiner*—Joseph Scovronek
*Attorney, Agent, or Firm*—Sughrue, Rothwell, Mion, Zinn and Macpeak

[57] ABSTRACT

The invention relates to a method and device for producing polycrystalline silicon. The method consists in particular in purifying a bath of molten silicon which contains impurities by bubbling a mixture of chlorine and oxygen and in progressively crystallizing the purified silicon in a receptacle (22) which is moved vertically downwards in a vertical gradient of temperatures which increase towards the top. Application to manufacturing solar photocells.

9 Claims, 1 Drawing Figure

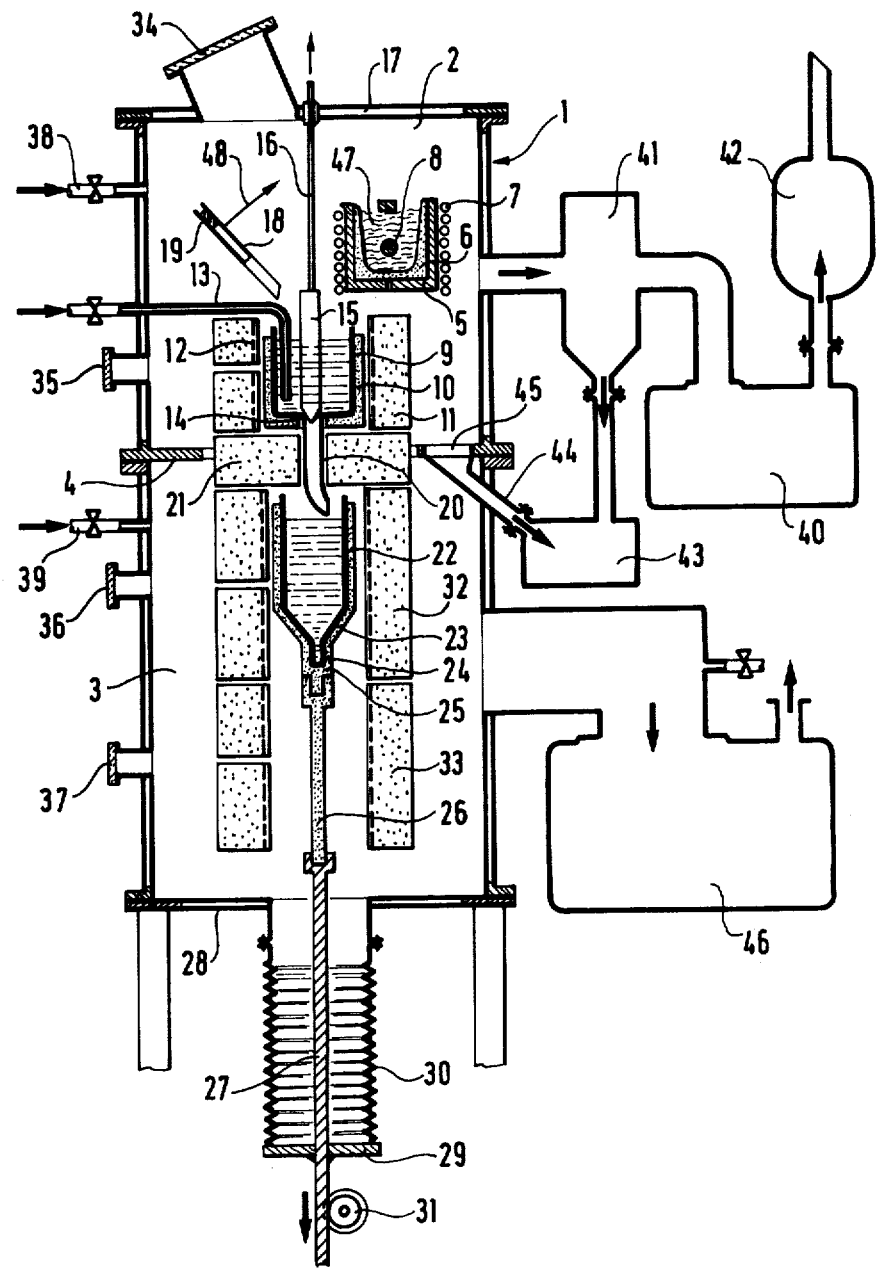

4,242,307

DEVICE FOR PRODUCING POLYCRYSTALLINE SILICON

FIELD OF THE INVENTION

The present invention relates to a method and device for producing polycrystalline silicon and more particularly a method and device for producing polycrystalline silicon with a view to manufacturing solar photocells.

BACKGROUND OF THE INVENTION

A known method of producing polycrystalline silicon suitable for manufacturing solar photocells consists firstly in purifying silicon of metallurgical quality. To do this, the metallurgical silicon is treated with anhydrous hydrochloric acid at a temperature of about 250° C. to form gaseous trichlorosilane which is successively subjected to fractional distillation and to reduction by hydrogen at a temperature of about 1000° C. The method then consists in melting the electronic quality silicon thus obtained in a crucible and in subjecting the mass of molten silicon in the crucible to a vertical temperature gradient, the upper surface of the molten mass being subjected to a temperature slightly lower than the melting point of silicon, e.g. 1400° C. and the lower surface being in contact with the crucible whose temperature is maintained at the most at 1200° C.

The known method described hereinabove has the disadvantage of being very expensive. Indeed, fractional distillation must include a great number of successive distilling operations and the reducing operation is also long and tricky. Further, the device for using the method is very complex and requires considerable investment.

The present invention aims to mitigate this disadvantage and to develop an economical method which makes it possible to reduce the cost price of polycrystalline silicon such as that used for making solar photocells.

SUMMARY OF THE INVENTION

The present invention provides a method of producing polycrystalline silicon consisting in purifying silicon which contains impurities and in solidifying a liquid molten mass of purified silicon in a receptacle subjected to a vertical temperature gradient, characterized in that:

the silicon which contains impurities is produced by heating a mixture of carbon and silica so as to form a liquid bath of silicon after carbon dioxide has been liberated;

the silicon which contains impurities is purified by making a gas which contains chlorine and oxygen bubble in the liquid bath;

the vertical temperature gradient is provided by a vertical heating sleeve which surrounds the receptacle, the temperatures at the top and at the bottom of the sleeve being respectively higher and lower than the melting point of silicon: and the liquid mass of purified silicon is solidified by a relative vertical movement of the receptacle and of the sleeve so as to cause successively progressive crystallization of the lower, middle and upper portions of the liquid mass contained in the receptacle.

The present invention also provides a device for using the method, characterized in that it includes, inside a chamber:

a first crucible which is capable of containing said mixture of carbon and silica, the first crucible being provided with heating means and means for tilting the crucible on a horizontal axle;

a second crucible which, when the contents of the first crucible are tipped into it, is capable of containing the liquid bath of molten silicon which contains impurities, the lower part of the second crucible having a drainage orifice and removable means for stopping the orifice;

a pipe which passes through the wall of the chamber and which leads to the inside of the second crucible, the pipe being connected to a source of gas which bubbles through the molten silicon;

means for heating said second crucible to maintain the temperature of said bath above the melting point of silicon;

a vertical receptacle disposed to contain the purified liquid silicon which flows from said orifice when the latter is not stopped;

a heating sleeve which surrounds said receptacle and means for maintaining the temperatures at the top and bottom of said sleeve respectively higher and lower than the melting point of silicon;

means for vertically moving the receptacle along the axis of the sleeve; and pumping means which are capable of pumping the gases out of the chamber.

BRIEF DESCRIPTION OF THE DRAWING

The invention is described hereinbelow by way of an example with reference to the accompanying drawing in which the single FIGURE illustrates schematically one embodiment of the device in accordance with the invention.

DESCRIPTION OF THE PREFERRED EMBODIMENT

The single FIGURE shows a vertical cylindrical chamber 1 which can be made of stainless steel. The walls of the chamber 1 have hollow portions in which an organic heating liquid is made to circulate to heat the chamber. The chamber is divided into two compartments 2 and 3 separated by a horizontal middle partition 4.

A crucible 5 of the self crucible type is disposed in the upper compartment 2. It then includes a segmented metal shell which has external cooling means (not shown). Powder 6 constituted by a mixture of carbon and silica is disposed in the crucible 5. A conductive winding 7 which is fed by a high-frequency electric generator (not shown). The crucible 5 includes mechanical means which are capable of making it tilt about a horizontal axis 8 so as to pour its contents into another crucible 9 disposed below the crucible 5 inside the chamber 1.

The crucible 9 is made of quartz and is supported by a graphite support 10. A vertical oven 11 which includes graphite heating resistors 12 is disposed around the crucible 9. A pipe 13 passes through the cylindrical wall of the chamber 1 and leads into the lower part of the inner space of the crucible 9 which has a drainage orifice 14 in its bottom part. The drainage orifice 14 is shown stopped by a removable silica stopper 15 connected to a control rod 16 which passes through the upper wall 17 of the chamber 1. A tube inclined at 18° is disposed above the crucible 9. A doping material 19 is inserted in the crucible by means of removable stopping means illustrated by an arrow 48, said means being controllable from the outside of the chamber 1.

The orifice 14 of the crucible 9 leads into a vertical silica tube 20 which passes through a block 21 of insulating material which constitutes a part of the horizontal partition which separates the compartments 2 and 3 of the chamber 1.

The lower end of the tube 20 is situated in the upper part of the inside space of a vertical receptacle 22 disposed in the compartment 3 of the chamber 1. The largest part of the receptacle 22 has a square cross-section but its lower part has a progressively narrowing, substantially pyramidal cross-section 23 which ends in a cylindrical bottom 24 of small diameter. The receptacle 22 is preferably made of quartz and has a graphite support 25 which is extended by a graphite rod 26 whose lower part is fixed to the end of a metal control rod 27 which passes through the lower wall 28 of the chamber 1 via a horizontal disk 29 fixed on the rod 27 and connected to the wall 28 by bellows 30. Mechanical drive means 31 make it possible to move the rod 27 vertically along its axis without vibration.

Again inside the compartment 3, two superposed vertical cylindrical ovens 32 and 33 which include graphite heating resistors are disposed around the receptacle 22 and the rod 26. These two ovens constitute heating sleeves which are capable of generating a vertical temperature gradient.

The chamber 1 includes observation ports such as the port 34 situated on the upper wall 17 of the chamber and the lateral ports 35, 36 and 37 which can also be used to measure the temperature of the ovens 11, 32 and 33 by means of an optical pyrometer, not shown.

The chamber 1 also includes gas inlets 38 and 39 on its side surface. The inlets each have a check valve through which a neutral gas can be inserted in the compartments 2 and 3 of the enclosure 1.

A pump 40 which is capable of setting up a vacuum of about $10^{-3}$ torr is connected to the compartment 2 of the chamber 1 via a condenser 41. The pump 40 allows the vapour contained in the compartment 2 to be sucked up and one part thereof to be condensed and the other part to be ejected into the surrounding atmosphere via a gas-cleaning plant 42.

A condensation tank 43 is connected by a pipe 44 to an opening 45 in the horizontal partition 4. As illustrated, the outlet of the condenser 41 can be connected to the tank 43.

Another vacuum pump 46 can be connected to the compartment 3 of the chamber 1.

The device illustrated in the figure implements the method of producing polycrystalline silicon in accordance with the invention.

The material used at the outset is silica in the form of quartzite which, by way of example, contains 800 parts per million of impurities, these impurities mainly comprising aluminum and iron.

When it has been crushed, the material is mixed with carbon power obtained by pyrolysis of a gaseous hydrocarbon and containing, e.g. 15 to 30 parts per million of impurities. The mixture is formed in the stoichiometric proportions of the reaction.

$$SiO_2 + 2C \rightarrow Si + 2CO \qquad (1)$$

The mixture is dried in a drying and pulverizing chamber so as to obtain dry granulated products with dimensions lying between 0.1 and 1 millimeter.

The dry mixture is put into the crucible 5 which is heated by making a high-frequency electric current pass through the winding 7. The passage of the induced current in the powder can be triggered by adding pieces of graphite to the powder. This results in the reduction of the silicon according to reaction 1 and the melting of the silicon, in the central zone 47 of the internal space of the crucible 5; a layer 6 of unmelted powder in contact with the inner wall of the crucible 5 remains during melting due to the cooling of the crucible. The temperature is brought to about 1800° C. The carbon dioxide vapour which is liberated in the molten zone 47 during the reaction is sucked in by the pump 40. During this time, it is possible to inject a neutral gas such as argon through the inlet 38 of the compartment 2.

When the reaction is finished, a bath of molten silicon containing impurities is obtained, the silicon is cast in the crucible 9 by operating the tilting system of the crucible 5, the opening 14 of the crucible 9 being stopped by the stopper 15.

The temperature of the bath contained in the crucible 9 is kept by the oven 11 at a temperature higher than the melting point of silicon, for example 1600° C.

A gaseous mixture of chlorine and oxygen is then injected into the pipe 13 so as to make the gaseous mixture bubble in the bath of molten silicon. During the bubbling, the impurities such as aluminum and iron contained in the bath change to the state of volatile chlorides which are sucked in by the pump 40. Part of this vapour is condensed in the condenser 41 and is deposited in the tank 43. Another part of this vapour is condensed on the inner walls of the compartment 2 and the condensation liquid flows through the opening 45 into the tank 43. The flow of a heating liquid at a temperature of about 200° C. in the passages formed in the wall of the chamber reduces the condensation of the chloride vapour on the inner wall of the chamber. Lastly, that part of this vapour which cannot be condensed is ejected into the atmosphere after passing through the gas-cleaning plant 42.

Thus, a liquid bath of purified silicon is obtained in the crucible 9. A predetermined mass 19 of a parent alloy of silicon and of a doping product such as boron is put in the bath by means of tube 18. The alloy melts in the bath so as to dope the mass of molten silicon.

The liquid bath of purified and doped silicon is then cast in the receptacle 22 through the tube 20 by lifting the rod 16 which is integral with the stopper 15.

Such as it is shown in the figure, the receptacle 22 is surrounded by the vertical oven 32 whose internal temperature is maintained at about 1600° C., i.e. at a temperature higher than the melting point of silicon.

The receptacle 22 is moved vertically downwards so that the bottom 24 of the receptacle 22 progressively enters the volume heated by the lower oven 33 whose internal temperature is maintained at about 1400° C., i.e. at a temperature lower than the melting point of silicon. The vertical movement is continued until the receptacle 22 is surrounded for its whole height by the lower oven 33. The lower, middle and upper portions of the mass of liquid silicon contained in the receptacle 22 are thus progressively crystallized. During the progresive movement of the receptacle 22, it is possible to inject a neutral gas such as argon into the compartment 3 of the chamber 1, the argon being ejected into the atmosphere by the pump 46 after circulating in the compartment.

It should be observed that the progressive crystallization due to the vertical downward movement of the receptacle causes extra purification of the silicon besides that caused by the bubbling of the gas formed by chlorine and oxygen in the liquid bath. Indeed, any impurities which remain are moved progressively towards the upper part of the ingot during the movement.

The receptacle 22 which contains the crystallized mass is kept inside the furnace 33 for a sufficient time to anneal the mass at a slightly lower temperature than the melting point of silicon. This allows the mechanical stresses induced by the crystallization to be reduced and the doping material to be homogenized in the silicon mass. Then the oven 33 is cooled progressively to ambient temperature.

The silicon ingot thus obtained is very pure, except for the upper crust which is preferably not used, nor is the lower end whose cross-section is too small. The ingot has a polycrystalline structure which makes it suitable for producing silicon solar photocells. It should be observed that the polycrystalline block of silicon obtained can contain relatively great volumes of monocrystalline silicon.

As is well-known, the ingot can be cut up by means of a multiple-blade saw so as to obtain very thin slices which are used to produce solar photocells or semiconductor components in general.

The method described hereinabove has the advantage of being economical. Indeed, the silicon forming, purifying and crystallizing operations are carried out in such a way that the treated material changes only once from the liquid state to the solid state. A very great amount of energy is thus saved with respect to the method according to the prior art cited hereinabove, in which, in particular, the many successive distillations dissipate a considerable amount of energy. Due to the small number of operations, the loss of material is low, contrary to what happens in the method according to the prior art. Further, the device for using the method avoids the need for handling or transporting materials and can easily be automatized. Lastly, the investment expense is low with respect to that of the device according to the prior art and the production capacity of the device in accordance with the invention can reach e.g. 50 kg of polycrystalline silicon per 3-hour cycle.

I claim:

1. A device for producing polycrystalline silicon by purifying silicon which contains impurities and solidifying a liquid molten mass of purified silicon by subjecting the liquid mass to a vertical temperature gradient, said device comprising:
    a chamber,
    a first crucible within said chamber for containing a mixture of carbon and silica,
    means for heating said first crucible, and
    means for tilting said crucible about a horizontal axle,
    a second crucible positioned within said chamber below said first crucible and positioned to receive the liquid bath of molten silicon which contains impurities upon tilting of said first crucible about said horizontal axle,
    said second crucible having a drainage orifice within a lower part thereof,
    movable means for stopping said drainage orifice,
    a pipe passing through the wall of said chamber and leading to the inside of said second crucible,
    means for connecting said pipe to a source of gas for bubbling through the molten silicon,
    means for heating said second crucible to maintain the temperature of said bath above the melting point of silicon,
    a vertical receptacle disposed beneath said second crucible and positioned relative to said orifice so as to receive the purified liquid silicon flowing from said orifice when said orifice is not stopped,
    a heating sleeve surrounding said receptacle and means for maintaining the temperatures at the top and bottom of said sleeve respectively higher and lower than the melting point of silicon,
    means for vertically moving said receptacle along the axis of said sleeve, and
    pumping means for pumping the gases out of said chamber.

2. A device according to claim 1, wherein said receptacle includes a lower part having a tapering cross-section.

3. A device according to claim 1, wherein said heating sleeve comprises two vertically superposed cylindrical ovens.

4. A device according to claim 1, wherein said pumping means comprises a vacuum pump connected to said chamber via a pumping circuit, and said device further comprising a condenser disposed in the pumping circuit between said chamber and said vacuum pump.

5. A device according to claim 1, further comprising means for circulating a neutral gas within said chamber.

6. A device according to claim 1, further comprising a condensation tank for collecting the product of condensation on the inner wall of said chamber from vapour escaping from said bath during silicon purification.

7. A device according to claim 1, wherein said chamber comprises spaced inner and outer walls, and wherein said device further comprises means for circulating a heating fluid between said spaced inner and outer walls of said chamber.

8. A device according to claim 1, wherein said first crucible is of the self-crucible type and wherein said means for heating said first crucible comprise an electric induction winding.

9. A device according to claim 1, further comprising means for introducing a doping material into the mass of purified liquid silicon contained in said second crucible.

* * * * *